(12) United States Patent  (10) Patent No.: US 7,531,997 B2
Mariani et al.  (45) Date of Patent: May 12, 2009

(54) CONTROL DEVICE OF A SWITCHING CONVERTER AND RELATIVE SWITCHING CONVERTER

(75) Inventors: Adalberto Mariani, Garlasco (IT); Silvio Pepino, Aosta (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 86 days.

(21) Appl. No.: 11/836,054

(22) Filed: Aug. 8, 2007

(65) Prior Publication Data

US 2009/0039850 A1  Feb. 12, 2009

(51) Int. Cl.
*G05F 1/575* (2006.01)
*G05F 1/618* (2006.01)

(52) U.S. Cl. ...................... 323/284; 323/285

(58) Field of Classification Search ......... 323/224, 323/265, 271, 282, 384, 285, 288, 349, 351
See application file for complete search history.

(56) References Cited

U.S. PATENT DOCUMENTS 5,965,001 A * 10/1999 Chow et al. ............... 204/600
6,894,471 B2 * 5/2005 Corva et al. ............... 323/282
7,042,203 B2 * 5/2006 Van Der Horn et al. ..... 323/285
7,309,977 B2 * 12/2007 Gray et al. ................ 323/284

\* cited by examiner

*Primary Examiner*—Gary L Laxton
(74) *Attorney, Agent, or Firm*—Lisa K. Jorgenson; E. Russell Tarleton; Seed IP Law Group PLLC (57) ABSTRACT

A control device for a switching converter having an input terminal and an output terminal, a half-bridge of a first and a second transistor coupled between the input terminal and a reference voltage the control device including a first circuit structured to detect signal on the output terminal of the converter and to integrate the detected signal and regulate on the average value of the detected signal by comparison with a further reference signal, and then drive the first and second transistor as a function of the regulation. The control device further includes a switching circuit for turning off the first circuit so that the control device carries out a regulation on the detected signal by comparison with a further reference signal and drives the first and second transistors when current passing between the output terminal of the converter and the half-bridge crosses zero.

20 Claims, 10 Drawing Sheets

CONTROL DEVICE OF A SWITCHING CONVERTER AND RELATIVE SWITCHING CONVERTER

BACKGROUND

1. Technical Field

The present disclosure pertains to a control device for a switching converter and relative switching converter, preferably a converter from direct voltage to direct voltage.

2. Description of the Related Art

Figure 1:
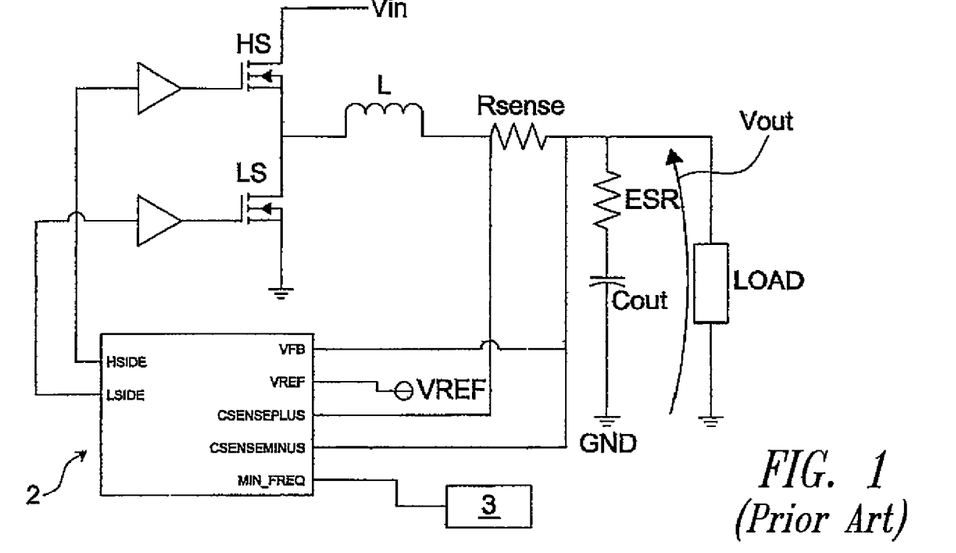
FIG. 1 shows a circuital scheme of a switching converter with constant turn-on time and provided with a controller operating in pulse frequency mode in accordance with the known art.

In the state of the art converters from direct voltage to direct voltage or DC-DC converters are generally known; a switching converter with controller in pulse frequency mode and with a constant turn-on time is shown in FIG. 1. The converter includes a first MOS transistor HS having a non-drivable terminal connected to an input voltage Vin and another non-drivable terminal connected to a terminal of an inductance L and to a non-drivable terminal of another MOS transistor LS that has its other non-drivable terminal connected to ground GND. The inductance L has its other terminal connected to a sense resistance Rsense that in turn is connected to a filter constituted by a resistance ESR in series to a capacitor Cout where the resistance ESR is the parasitic resistance of the capacitor Cout; the filter is placed in parallel to the load LOAD. The converter comprises a control circuit 2 having in input on the terminals CSENSEPLUS and CSENSEMINUS the current detected at the terminals of the resistance Rsense, the output voltage Vout at the terminals of the load LOAD on the input terminal VFB, a reference voltage VREF and the clock pulses MIN_FREQ coming from a timer 3. The control circuit 2 is suitable for driving the transistors HS and LS by means of the drive signals HSIDE and LSIDE.

Figure 2:
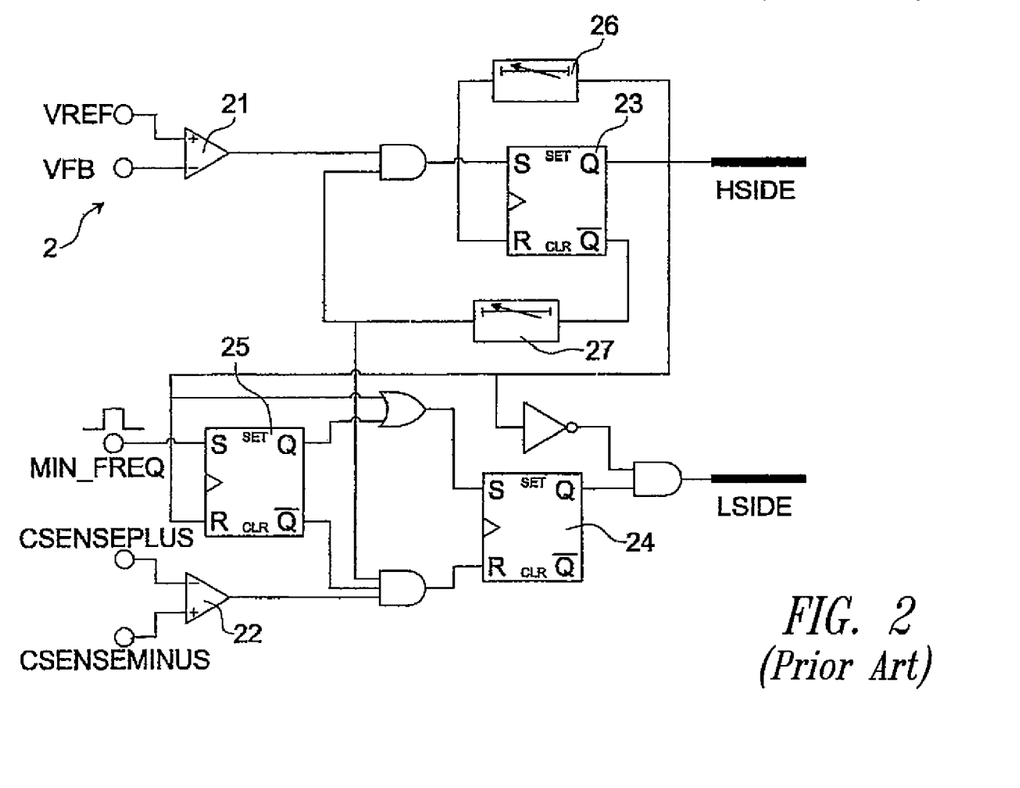
FIG. 2 is a more detailed circuital scheme of the controller of FIG. 1.
Figure 3:
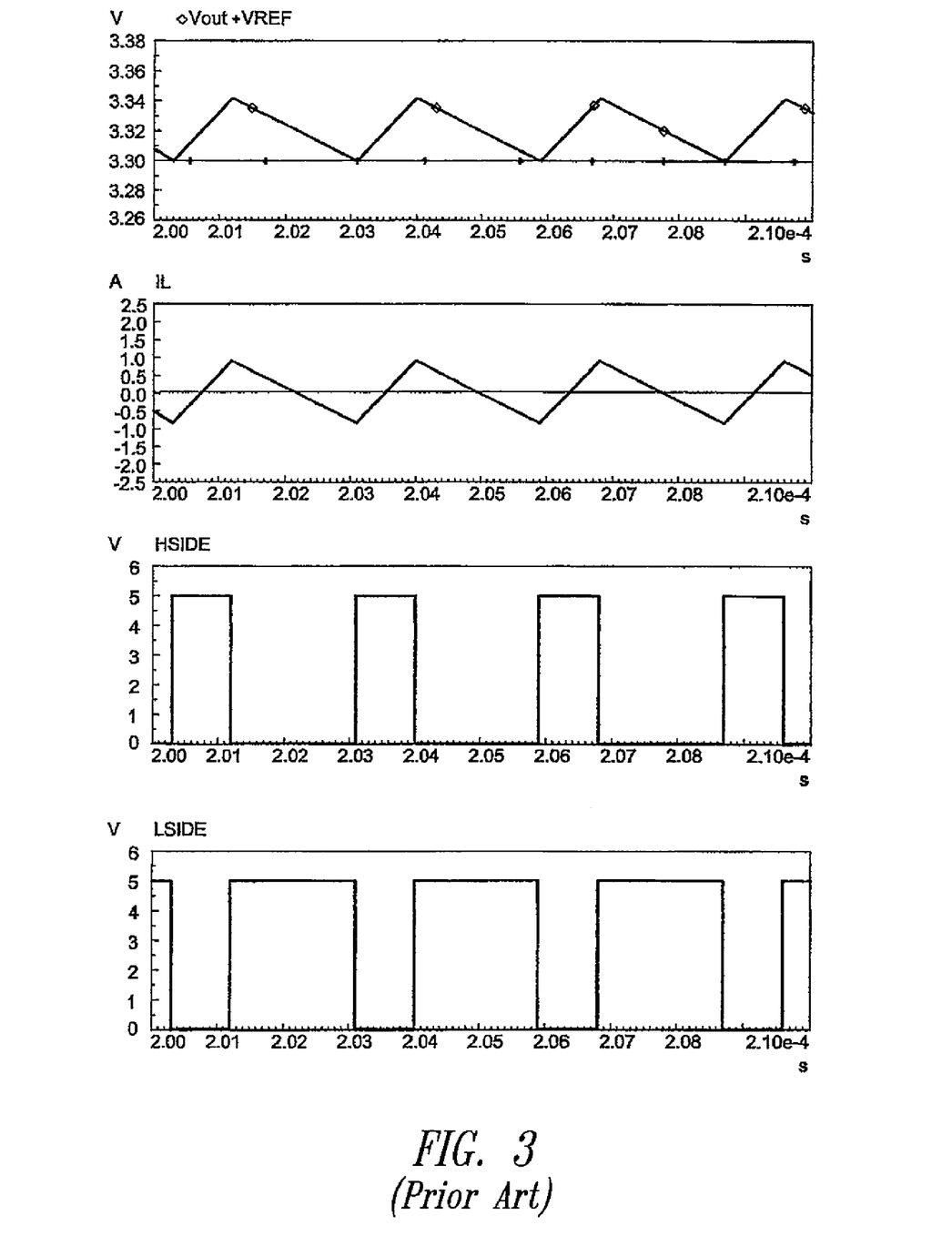
FIG. 3 shows time diagrams of signals in the converter of FIG. 1.

In FIG. 2 the control circuit 2 is shown in more detail to include a comparator 21 suitable for comparing the voltage Vout, present on the terminal VFB, with the voltage VREF, a comparator 22 having the input terminals coinciding with the terminals CSENSEPLUS and CSENSEMINUS and suitable for detecting the zero crossing of the current that flows through the inductance L and three set-reset latches or flip-flops 23-25 in which the flip-flop 23 has the input set S coupled with the output of the comparator 21, the flip-flop 24 has the input reset R coupled with the output of the comparator 22 and the flip-flop 25 has the input set S connected with the output of the oscillator 3. The outputs of the flip-flops 23 and 24 are respectively the drive signals HSIDE and LSIDE for the transistors HS and LS. The circuit 2 also includes a timer 26 which when the input is at a low logic level has a low output. Initially the set reset flip-flops 23 and 25 are reset while the flip-flop 24 is set. When the signal Vout falls below the value VREF the comparator 21 sets the flip-flop 23; in this manner the signal HSIDE is raised while the signal LSIDE is lowered and the voltage Vout rises above the value of the voltage VREF. After a period given by the turn-on time Ton of the transistor HS the timer 26 changes the output signal taking it to a high logic level; and the signal resets the flip-flop 23, which in turn lowers the signal HSIDE and raises the signal LSIDE. In these operating conditions, that is for loads exceeding half the ripple on the induction current IL in pulse width modulation, the period Tp of repetition of the charge transfer cycles in output in the converters is equal to Ton*Vin/Vout. FIG. 3 shows the time diagrams of the voltages Vout and VREF, of the current IL on the inductance L and of the signals HSIDE and LSIDE.

When the load LOAD absorbs low value currents, for example on the order of milliamperes, it can happen that the inductor current IL becomes negative during the turn-off period Toff of the transistor HS. In this case the comparator 22 resets the flip-flop 24 so as to lower the signal LSIDE. In this manner the half-bridge constituted by the transistors LS and HS is left at high impedance to prevent the inversion of the sign of the current, and the output voltage Vout is discharged on the load LOAD. When the voltage Vout falls below the value of VREF the flip-flop 24 is set and the previous cycle is repeated with the turn-on of the transistor HS; the control circuit 2 works in pulse frequency mode. The control circuit 2 can also comprise a timer 27 suitable for establishing the minimum turn-off time Toff of the transistor HS; in this manner the stability is ensured in regard to the noise induced by the switching of the transistors HS and LS.

Figure 4:
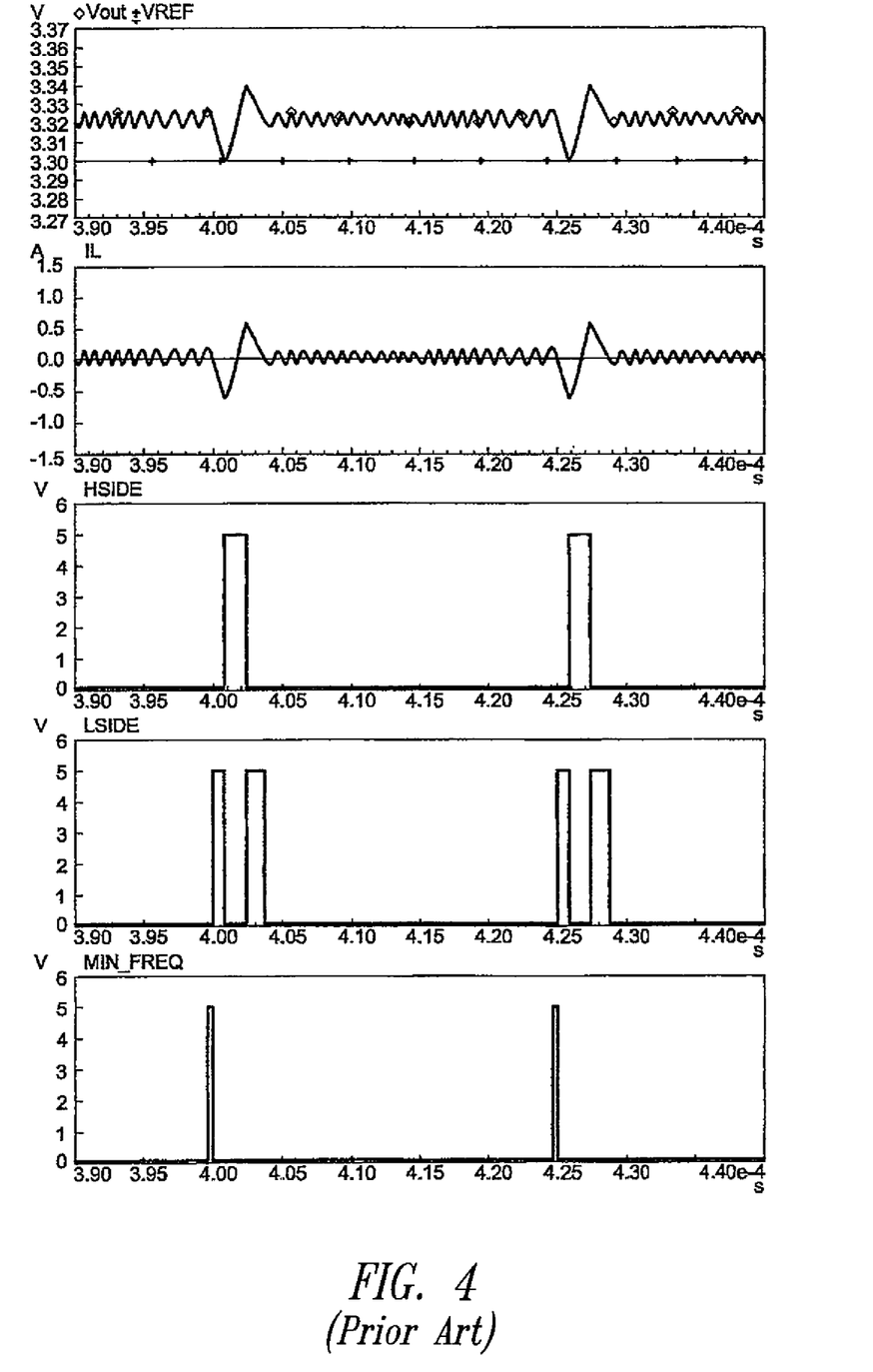
FIG. 4 shows time diagrams of signals in the converter of FIG. 1 with the activation of the flip-flop 25.

In the case of low load and in the presence of pulse frequency modulation a charge $$Q = \frac{1}{2}\frac{Vin - Vout}{L}Ton(Ton + Toff) = \frac{1}{2}\frac{Vin - Vout}{L}\frac{Vin}{Vout}Ton^2$$

is transferred at every cycle. The frequency fp of repetition of the charge transfer cycles in output in the converters is directly proportional to the current on the load Iload because fp=Q/Iload; if the current becomes low, the frequency fp can return within the range of frequencies audible by man. For this reason the converter has a device for limiting the minimum frequency; the device in this embodiment is implemented by the timer 3. When in the conditions of detection of negative current IL and consequent lowering of the signals HSIDE and LSIDE, the timer 3 prevents the pulse period Tp, inverse of the frequency fp, from exceeding a predefined value Tpmax by sending a pulse to the set input of the flip-flop 25 which, in turn, sends a signal on the set input of the flip-flop 24 to raise the value of the signal LSIDE. When the voltage Vout falls below the value VREF, the flip-flop 25 is reset. In FIG. 4 the course of the voltage Vout, of the current IL and of the signals HSIDE, LSIDE and MIN-FREQ if the flip-flop 25 is activated can be seen.

Figure 5:
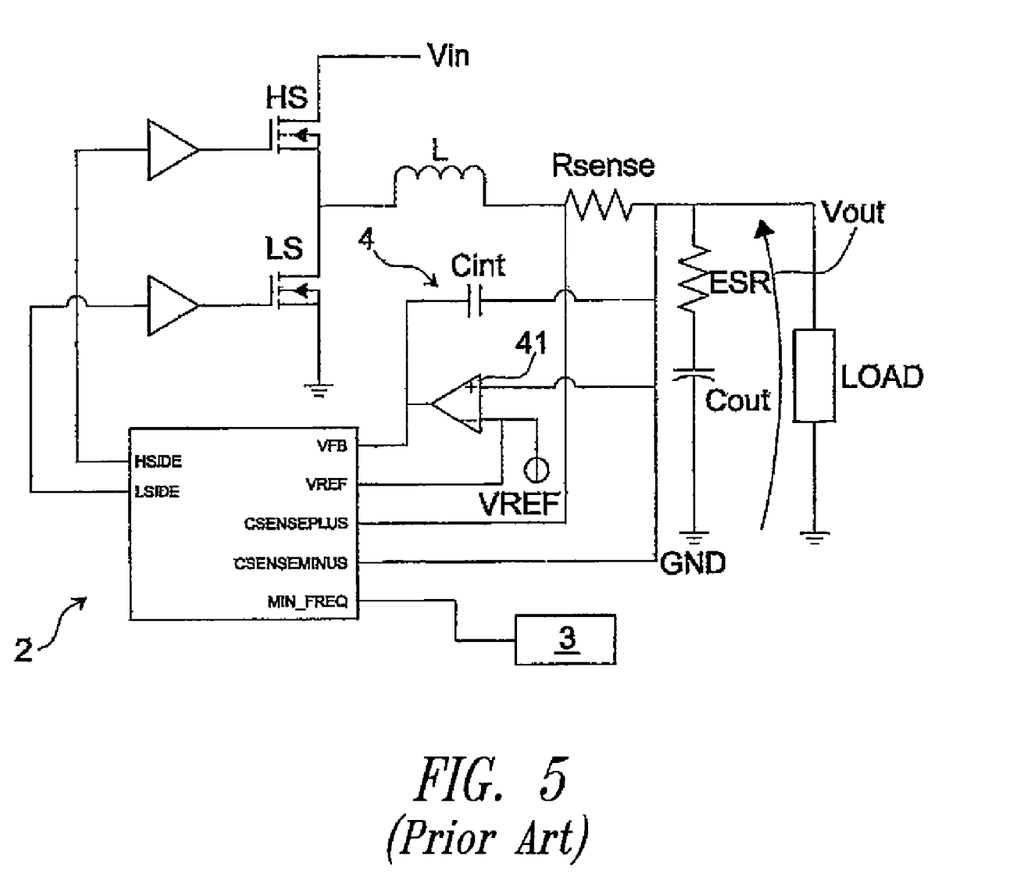
FIG. 5 shows a circuital scheme of another switching converter with constant turn-on time and provided with a controller working in pulse frequency mode in accordance with the known art.

A converter of this type suffers from an error in direct current given by half of the ripple on the output signal Vout; this comes about because the regulation is carried out on the minimum value of the voltage Vout. An integrator can be inserted whose object is to correct the error, as shown in FIG. 5. The integrator 4 comprises a transconductance amplifier 41 having the inverting input connected to the reference voltage VREF and the non-inverting input connected to the voltage Vout. The integrator consists of a capacitor Cint connected between the voltage Vout and the output terminal of the amplifier 41 connected to the control circuit 2 so that the voltage VFB is $$VFB = \frac{Gm}{sCint}(Vout - Vref) + Vout$$

where Gm is the transconductance gain of the amplifier 41. In this case the comparator 21 compares the voltage VREF with the voltage VFB. To reach the stationary state the average of the voltage Vout within a cycle must be constant. Given that the comparator PWM compares the voltage VFB with the voltage VREF, the time average of the voltage VFB must also be constant, and therefore Vout=VREF must be direct. The regulation that is operated on the signal VFB is on the minimum values of the signal or valley of the signal VFB.

Figure 6:
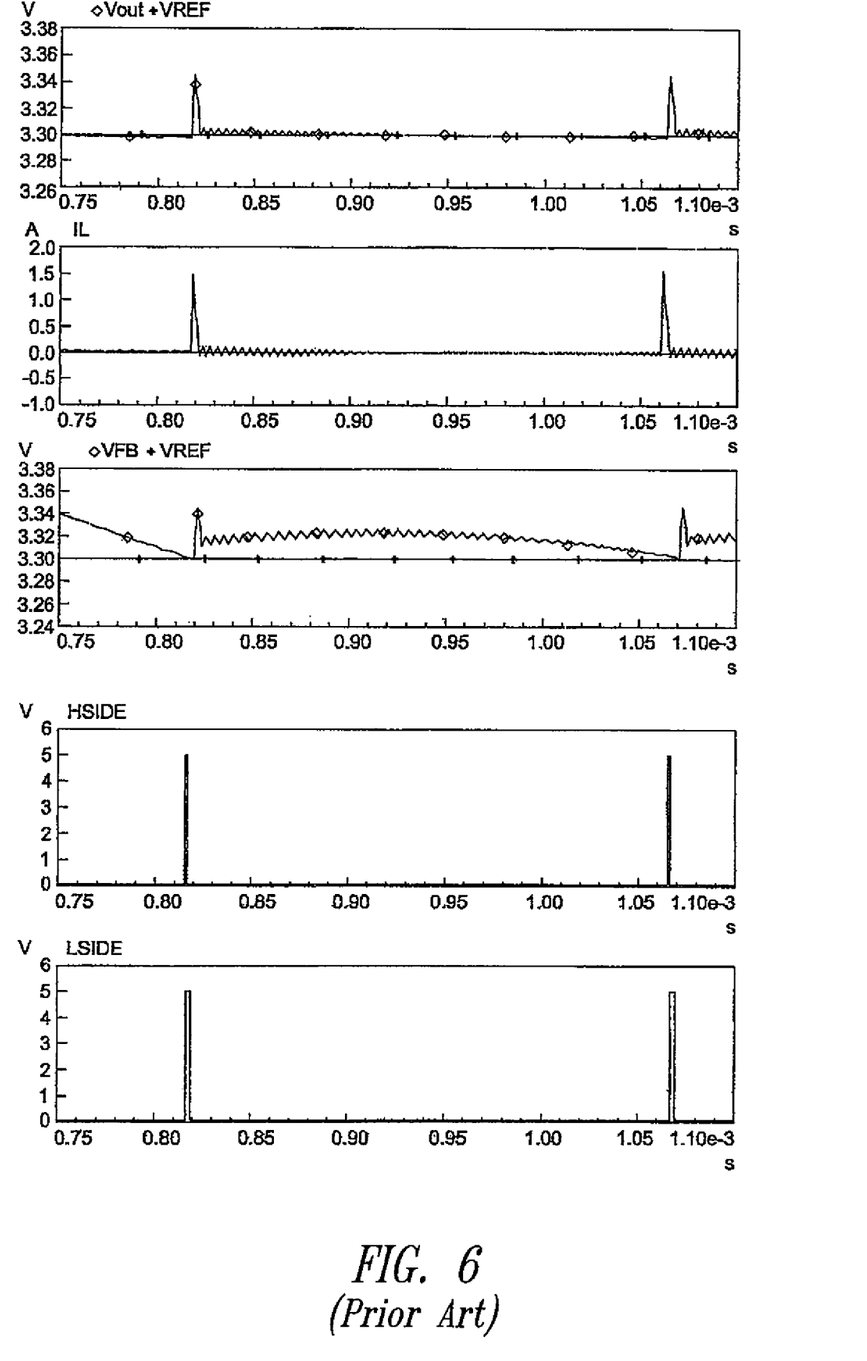
FIG. 6 shows time diagrams of signals in the converter of FIG. 5.

If the load LOAD absorbs low value currents the regulation on the signal Vout is made on the average value. After a cycle of turn-on time Ton and turn-off time Toff in which the current IL goes to zero, the output voltage Vout is overloaded in relation to the value VREF. While the output voltage remains above the regulated value VREF the integrator 4 raises the voltage VFB. When the load LOAD brings the output voltage below the voltage VREF, the voltage VFB decreases until it reaches the voltage VREF and the comparator 21 is triggered, as can be seen in the time diagrams of FIG. 6.

Figure 7:
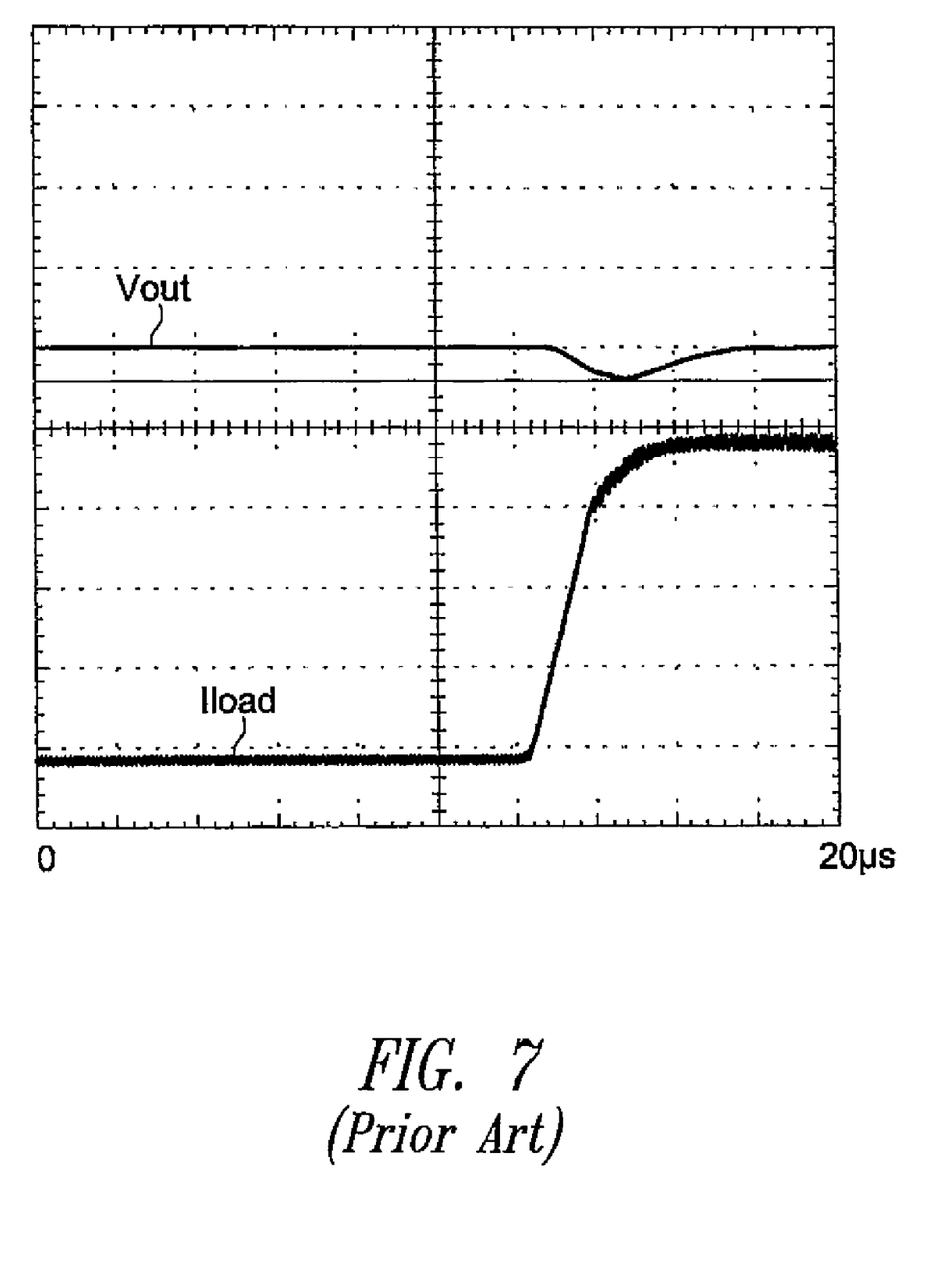
FIG. 7 shows the time diagram of the output voltage Vout of the converter in FIG. 5 and of the load current Iload.

Nevertheless it is possible that, when a charge transient is applied at the output of the converter by starting from a current of zero value, it has an undershoot at the output of the converter because the output of the integrator is overloaded and it is necessary to wait that the output of the integrator is brought at the regime situation before the control device reacts to the transient, as shown in FIG. 7 wherein Vout is the output voltage of the converter in FIG. 5 and IL is the current passing through the inductance.

BRIEF SUMMARY

The present disclosure provides a control device of a switching converter that overcomes the above-mentioned drawbacks.

In accordance with one embodiment, a control device for a switching device is provided that includes an input terminal and an output terminal, the converter including a half-bridge of a first and a second transistor coupled between the input terminal and a reference voltage. The control device further includes a circuit capable of detecting a signal on the output terminal of the converter and first means suitable for integrating the detected signal, the control device adapted to carry out a regulation on the average value of the detected signal by comparison with a further reference signal and being suitable for driving the first and second transistors as a function of the regulation. The control device also includes a circuit suitable for turning off the first circuit so that the control device carries out a regulation on the detected signal by comparison with a further reference signal and drives the first and second transistors as a function of the regulation when the current passing between the output terminal of the converter and the half-bridge crosses the zero.

In accordance with one embodiment of the present disclosure, a circuit is provided that includes first and second transistors coupled as a half-bridge between an input and an output of the circuit; a controller coupled to the first and second transistors; an integrator circuit coupled to the output and to the controller, the integrator circuit structured to integrate a signal on the output; and a switching circuit coupled to the integrator circuit and the controller and structured to turn off the integrator circuit and enable regulation of the signal on the output by comparison with a reference signal.

In accordance with another aspect of the foregoing embodiment, the integrator circuit includes a capacitor coupled to the output and to the controller and an amplifier having a first input coupled to the controller and to a reference voltage, a second input coupled to the output of the circuit, and an output coupled to the switching circuit. Ideally a voltage divider is coupled between the output of the circuit and both the second input of the amplifier and the switching circuit.

In accordance with another aspect of the present disclosure, the integrator circuit includes a capacitor coupled between the output and the controller and an amplifier having a first input coupled to the switching circuit, a second input coupled to the output of the circuit, and an output coupled to the capacitor and the controller, and further wherein the switching circuit is coupled to an output of the controller and to a reference voltage.

BRIEF DESCRIPTION OF THE SEVERAL VIEWS OF THE DRAWING(S)

The characteristics and the advantages of the present disclosure will appear evident from the following detailed description of an embodiment thereof, illustrated as non-limiting example in the enclosed drawings, in which.

DETAILED DESCRIPTION

Figure 8:
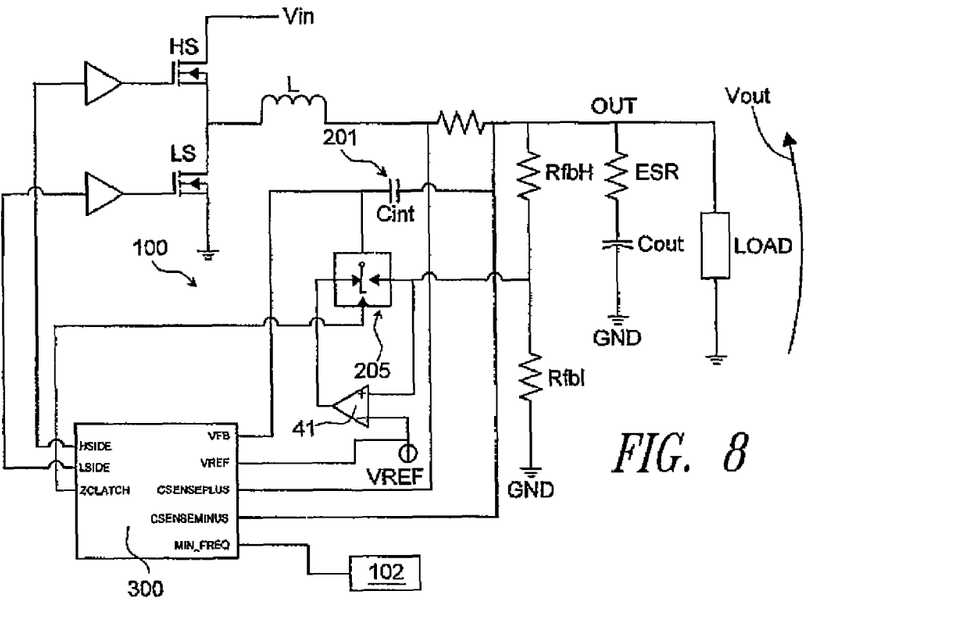
FIG. 8 is a circuital scheme of a switching converter according to a first embodiment of the present disclosure.

In FIG. 8 a switching converter according to a first embodiment of the present disclosure is shown. The switching converter has an input terminal IN on which the voltage Vin is present and an output terminal OUT to which the load LOAD is connected. The converter has a half-bridge of a first transistor HS and a second transistor LS coupled between the input terminal IN and a reference voltage, preferably ground GND, an inductance L coupled to the half-bridge and to the output terminal OUT, a control device 100 including a circuit capable of detecting a signal Vout on the output terminal OUT of the converter.

The control device includes an integrator 201 suitable for integrating the signal detected Vout and a device 102 suitable for imposing a preset minimum frequency to the signal detected Vout. The control device is suitable for carrying out a regulation on the average value of the signal detected Vout and for driving the first HS and second LS transistor as a function of the regulation. The control device 100 also includes a switching circuit 205 suitable for turning off the integrator 201 so that the control device carries out a regulation on the signal Vout when the current passing through the inductance L crosses the zero. The control device 100 has a logic circuit 300 having in input the signal VFB, which can be the output signal from the integrator 201 or a signal proportional to the output signal Vout, the signal VREF and the signal MIN_FREQ in output from the device 102, and it generates and sends the signals LSIDE and HSIDE for driving the transistors HS and LS.

The converter includes a series of two resistances Rfbh and Rfbl arranged between the terminal OUT and ground GND, and a series of resistances Rfbh and Rfbl are placed between the terminal OUT and ground GND.

The integrator 201 preferably has a transconductance amplifier 41 having the inverting input terminal connected with the reference voltage VREF and the non-inverting input terminal connected with the voltage Vout. The integrator further includes a capacitor Cint connected between the voltage Vout and the output terminal of the amplifier 41 connected to the control circuit 300 so that the voltage VFB, when the switching circuit 205 are not active, is $$VFB = \frac{Gm}{sCint}(Vout - Vref) + Vout$$

where Gm is the transconductance gain of the amplifier 41.

The switching circuit 205 has a switch adapted to connect a terminal of the capacitance Cint with the output terminal of the transconductance amplifier 41 or with the common terminal of the resistances Rfbh and Rfbl. The switch 205 is suitable for disconnecting the capacitance Cint from the output terminal of the amplifier 41 and for connecting it with the common terminal of the resistances Rfbh and Rfbl when the current IL passing through the inductance L crosses the zero. In this case the voltage across the capacitance Cint is maintained at a value substantially equal to the regulation value. The switch is commanded by the signal ZCLATCH coming from the logical circuit 300. In this manner the transconductance amplifier 41 acts, together with the capacitance Cint, as an integrator to correct the error given by half ripple on the output voltage Vout only when the capacitance Cint is connected with the output terminal of the amplifier 41.

The switching circuit 205 allows to reduce the undershoot at the output of the converter when a load transient is applied at the output by starting from a current value equal to zero. The undershoot is due to the fact that the output of the integrator is overloaded and it is necessary to wait until the output is brought to the regime condition before the control device reacts to the transient. The regulation is controlled by the offset voltage of the integrator when the amplifier 41 acts as an integrator and it is controlled by the ripple voltage and by the offset voltage of the comparator inside the control circuit 300 when the amplifier 41 does not act as an integrator.

Figure 9:
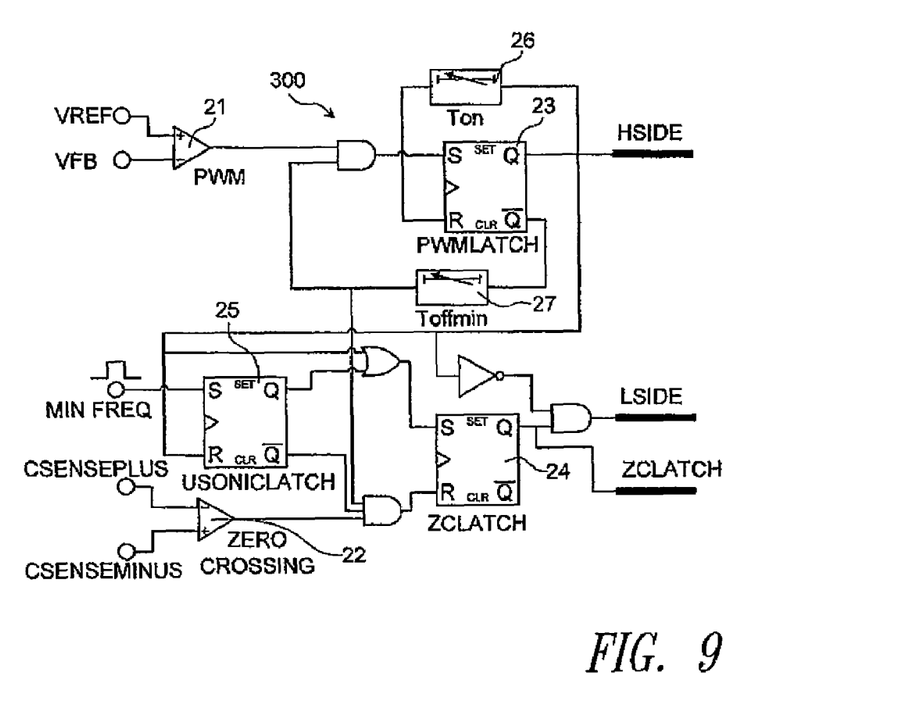
FIG. 9 is a detailed circuital scheme of a part of the control device of FIG. 7.

The control circuit 300 of the control device 100 can be seen better in FIG. 9 to include a comparator 21 suitable for comparing the voltage VFB, present on the terminal VFB, with the voltage VREF; a comparator 22 having the input terminals coinciding with the terminals CSENSEPLUS and CSENSEMINUS, that is the terminals of a resistance Rsense placed between the inductance L and the terminal OUT, and suitable for detecting the zero crossing of the current that flows through the inductance L; and three set-reset flip-flops 23-25 in which the flip-flop 23 has the set input S coupled with the output of the comparator 21, the flip-flop 24 has the reset input R coupled with the output of the comparator 22 and the flip-flop 25 has the set input S connected with the output of the timer 3. The outputs of the flip-flops 23 and 24 are respectively the drive signals HSIDE and LSIDE for the transistors HS and LS. The circuit 300 also includes a timer 26 which when the input is at a low logic level has a low output.

Initially the set-reset flip-flops 23 and 25 are reset while the flip-flop 24 is set. When the signal VFB falls below the value VREF, the comparator 21 sets the flip-flop 23; in this manner the signal HSIDE is raised while the signal LSIDE is lowered and the voltage Vout rises above the value of the voltage VREF. After a period given by the turn-on time Ton of the transistor HS, the timer 26 changes the signal in output taking it to a high logic level. The signal resets the flip-flop 23, which in turn lowers the signal HSIDE and raises the signal LSIDE. The circuit 300 also includes a timer 27 suitable for establishing the minimum turn-off time Toff of the transistor HS. In this manner the stability is assured in relation to the noise induced by the switching of the transistors HS and LS. The signal ZCLATCH is the signal Q at the output of the flip-flop 24.

Figure 10:
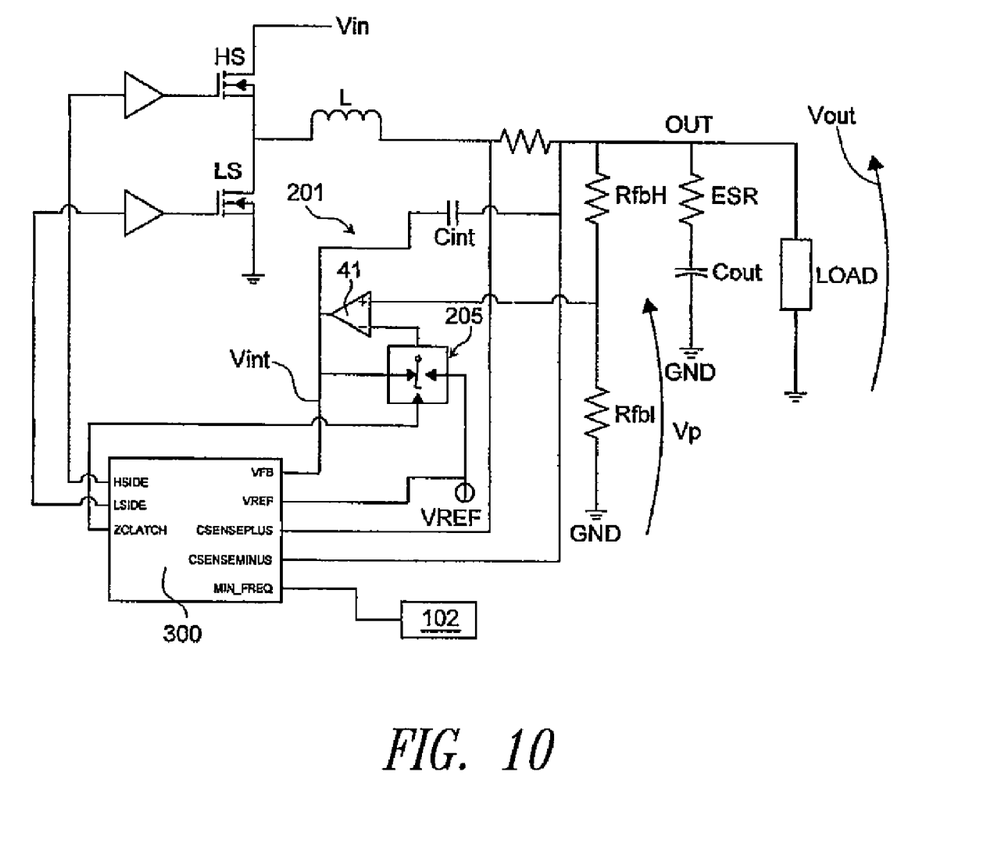
FIG. 10 is a circuital scheme of a switching converter according to a second embodiment of the present disclosure.

In FIG. 10 a switching converter according to a variant of the second embodiment of the present disclosure is shown. Differently from the case in FIG. 8, the switch 205 is suitable for disconnecting the inverting terminal of the amplifier 41 from the reference voltage Vref when the current passing through the inductance L crosses the zero and it is suitable for connecting the inverting terminal of the amplifier 41 with the output of the amplifier 41 so that the amplifier 41 is in a buffer configuration. The switch 205 is controlled by the signal ZCLATCH coming from the circuit 300. In this manner the transconductance amplifier 41 acts, together with the capacitance Cint, as an integrator to correct the error given by half ripple on the output voltage Vout and acts as a buffer when the inverting input terminal of the amplifier is connected with the output of the same amplifier 41.

With the circuit configuration in FIG. 10 the feedback divider is uncoupled by the presence of the buffer in the case wherein the current passing through the inductance L crosses the zero. The undershoot at the output of the converter is minimized. The regulation is controlled by the offset voltage of the integrator when the amplifier 41 acts as an integrator, and it is controlled by the offset voltage of the amplifier 41, by the ripple voltage, and by the offset voltage of the comparator of the part 300 when the amplifier acts as a buffer.

The factor due to the offset voltage of the amplifier 41 is present both when the amplifier acts as integrator and when it acts as buffer; this factor is balanced. Also the feedback divider is uncoupled from the control circuit 300.

Figure 11:
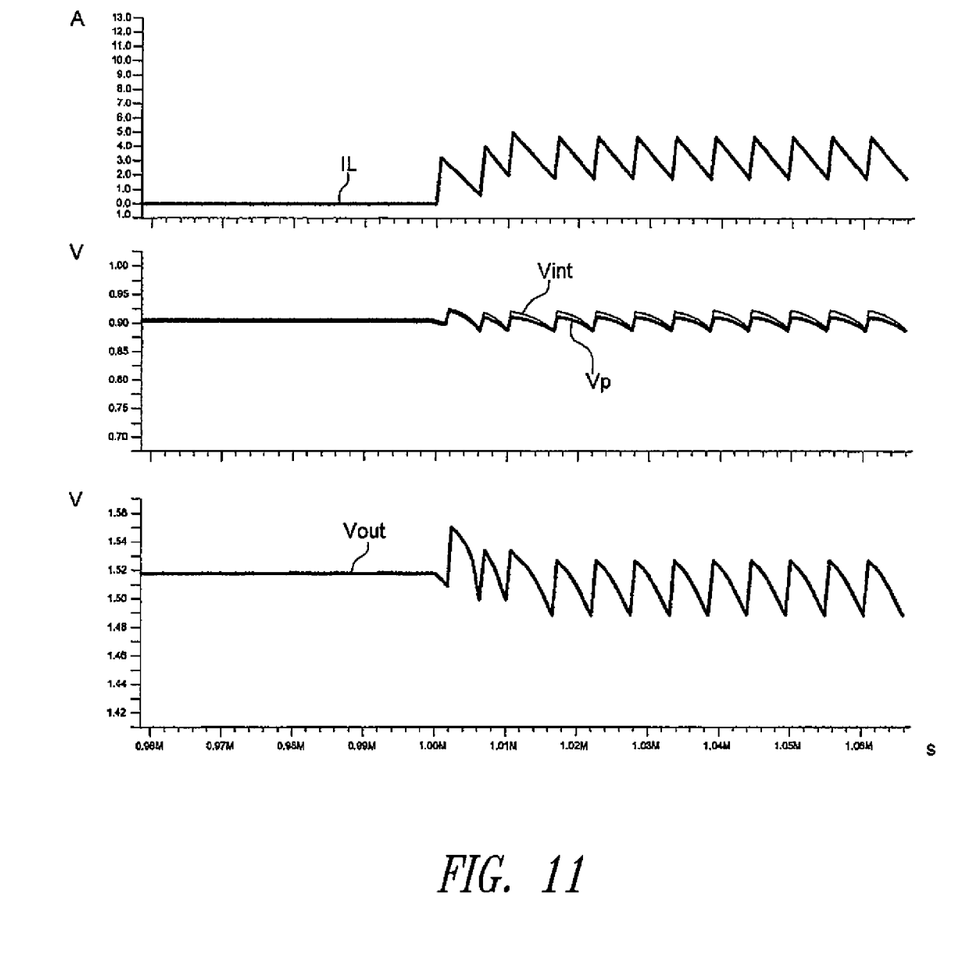
FIG. 11 shows a time diagram of the voltage and currents of the switching converter in FIG. 10.

FIG. 11 shows timing diagrams of the inductor current IL, the output voltage of the integrator Vint, the voltage Vp across the resistance Rfbl and the output voltage Vout. From the above-mentioned time diagrams it is observed that the control device responds immediately to a variation of the current IL without undershoot at the voltage output Vout.

Figure 12:
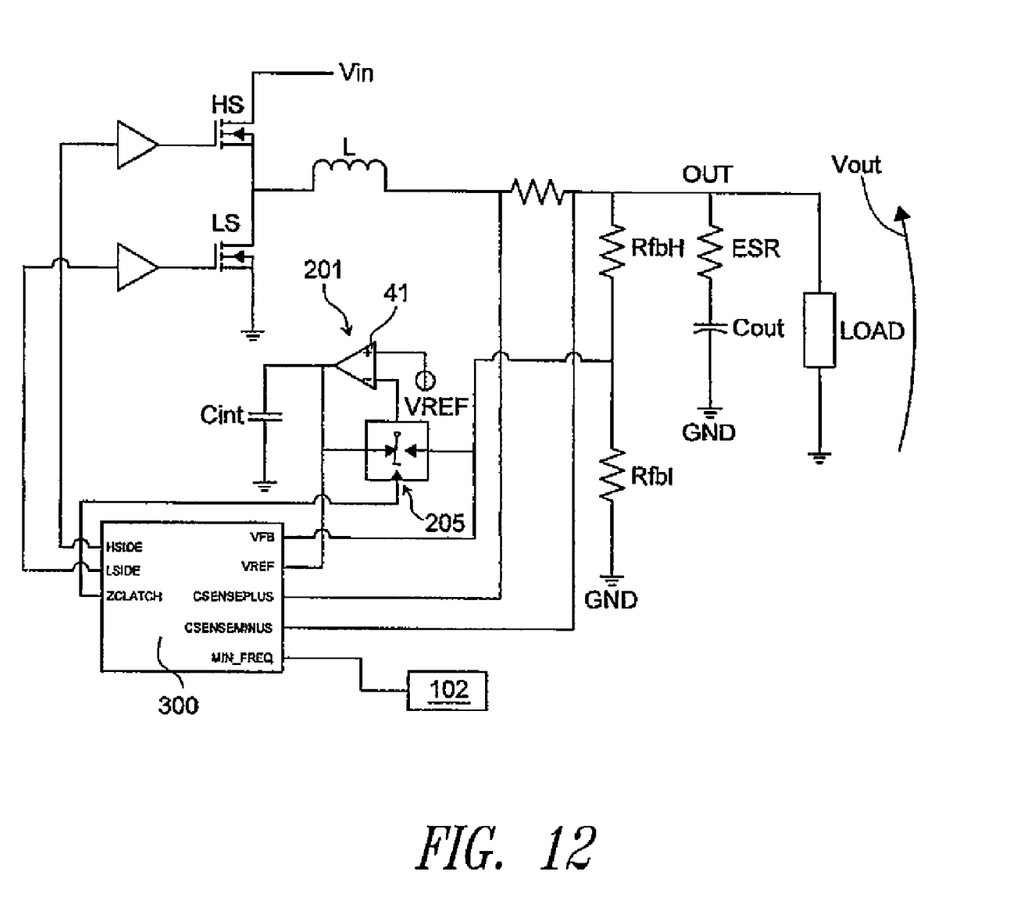
FIG. 12 is a circuital scheme of a switching converter according to a third embodiment of the present disclosure.

In FIG. 12 a switching converter according to another variant of the second embodiment of the present disclosure is shown. Differently from the converter shown in FIG. 8 the capacitor Cint is connected between the output of the amplifier 41 and ground GND, the non-inverting input terminal of the amplifier 41 is connected with the reference voltage Vref and the inverting input can be connected with the output of the amplifier 41 (when the amplifier acts as a buffer) or with the common terminal of the resistance Rfbh and Rfbl (when the amplifier 41 acts as an integrator) by means of the switch 205 controlled by the signal ZCLATCH. Differently from the converter in FIG. 8, the output of the amplifier is connected with the terminal Vref of the control circuit 300 and the common terminal of the resistance Rfbh and Rfbl is connected with the terminal Vfb of the control circuit 300. In this case wherein the amplifier 41 is in buffer configuration, the reference voltage Vref occurs at the terminal Vref of the control circuit 300 while the terminal Vfb of the control circuit 300 is always connected with the common terminal of the resistance Rfbh and Rfbl. In this case across the capacitance Cint is stored a voltage equal to Vref.

In the case of the converter in FIGS. 8 and 10, when the amplifier 41 acts as integrator, it has:

$$Vpwm = (Vout - Vreff) + \frac{gm}{sCint}(\alpha Vout - Vref)$$

where Vpwm is the voltage difference between the terminals of the comparator 21 of the part 300 and $$\alpha = \frac{Rfbl}{Rfbh + Rfbl}.$$

When the amplifier 41 is in buffer configuration it has:

$$Vpwm = Vout\frac{\alpha + sCint\alpha Rfbh}{1 + sCint\alpha Rfbh} - Vref$$

in the case of the converter in FIG. 8 and:

$$Vpwm = Vout\frac{\alpha + \frac{sCint}{gm}}{1 + \frac{sCint}{gm}} - Vref$$

in the case of the converter in FIG. 10.

In the case of the converter in FIG. 12, when the amplifier 41 acts as an integrator, it has:

$$Vpwm = \alpha Vout + \frac{gm}{sCint}(\alpha Vout - Vref)$$

while with the amplifier 41 in buffer configuration it has:

Vpwm=αVout-Vref.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control device for a switching converter having an input terminal and an output terminal, the converter having a half-bridge of a first and a second transistor coupled between the input terminal and a reference voltage, the control device comprising: a circuit adapted to detect a signal on the output terminal of the converter and a first circuit suitable for integrating the detected signal, the control device adapted to regulate an average value of the detected signal by comparison with a further reference signal and adapted to drive the first and second transistor as a function of the regulation, the control device comprising a switching circuit adapted to turn off the first circuit so that the control device carries out a regulation on the detected signal by comparison with the further reference signal and drives the first and second transistor as a function of the regulation when the current passing between the output terminal of the converter and the half-bridge crosses the zero.

2. The device of claim 1 wherein the switching circuit is structured to allow the first circuit to store a voltage substantially equal to the integrated output voltage.

3. The device of claim 1 wherein the switching circuit is structured to allow the first circuit to store a voltage substantially equal to the further reference voltage.

4. The device of claim 1 wherein the converter comprises an inductance coupled between the output terminal of the converter and the common terminal of the first and second transistors that comprise the half-bridge, the control device structured to regulate the detected signal when the current passing through the inductance crosses the zero.

5. The device of claim 1 wherein the switching circuit comprises a switch and switch controller to control the switch.

6. A device according to claim 1 wherein the first circuit suitable for integrating the detected signal comprises an amplifier having the input terminals coupled to the further reference signal and the detected signal and a capacitor coupled to the output terminal of the amplifier, the switching circuit controlling the connection of the capacitor with an input terminal of the amplifier and the disconnection with the output terminal of the amplifier when current passing between the output terminal and the half-bridge crosses the zero.

7. The device of claim 6 wherein the amplifier is a transconductance amplifier.

8. The device of claim 1 wherein the first circuit comprises an integrator that comprises an amplifier, and the switching circuit is structured to place the amplifier in a buffer configuration when current passing between the output terminal and the half-bridge crosses the zero.

9. The device of claim 8 wherein the first circuit comprises an integration capacitance coupled to the output terminal of the amplifier and the switching circuit comprises an interruption circuit arranged in the connection line between an input terminal of the amplifier and the further reference voltage, and a switch controller suitable for controlling the opening of the interruption circuit when current passing between the output terminal and the half-bridge crosses the zero.

10. The device of claim 5 wherein the switch controller comprises a zero crossing detector, the output signal of which controls the switch (205).

11. A switching converter comprising a control device as defined in claim 1.

12. A circuit, comprising:
first and second transistors coupled as a half-bridge between an input and an output of the circuit;
a controller coupled to the first and second transistors;
an integrator circuit coupled to the output and to the controller, the integrator circuit structured to integrate a signal on the output; and a switching circuit coupled to the integrator circuit and the controller and structured to turn off the integrator circuit and enable regulation of the signal on the output by comparison with a reference signal.

13. The circuit of claim 12, wherein the integrator circuit comprises a capacitor coupled to the output and to the controller and an amplifier having a first input coupled to the controller and to a reference voltage, a second input coupled to the output, and an output coupled to the switching circuit.

14. The circuit of claim 13, comprising a voltage divider coupled between the output of the circuit and both the second input of the amplifier and the switching circuit.

15. The circuit of claim 12 wherein the integrator circuit comprises a capacitor coupled between the output and the controller and an amplifier having a first input coupled to the switching circuit, a second input coupled to the output of the circuit, and an output coupled to the capacitor and the controller, and further wherein the switching circuit is coupled to an output of the controller and to a reference voltage.

16. The circuit of claim 15, comprising a voltage divider coupled between the output and the amplifier.

17. The circuit of claim 16 wherein the switching circuit is structured to turn off the integrator to enable regulation of a signal on the output of the circuit by comparison of the signal with a reference signal to drive the first and second transistors via the controller when current passing between the output of the circuit and the half-bridge crosses zero.

18. The circuit of claim 12 wherein the integrator comprises a transconductance amplifier having a first input coupled to the switching circuit, a second input coupled to a voltage reference, and an output coupled to the switching circuit and the controller, and the integrator further comprising a capacitor having a first terminal coupled to the output of the amplifier and a second terminal coupled to a reference potential.

19. The circuit of claim 18 wherein the switching circuit is coupled to the output of the circuit via a voltage divider, and further wherein the switching circuit is coupled to an output of the controller to control operation of the integrator.

20. The circuit of claim 19 wherein the controller comprises a switch controller and a zero crossing detector, the output of the switch controller controlling the operation of the integrator to turn off the integrator when current passing between the output of the circuit and the half-bridge crosses zero.

* * * * *